United States Patent
Wu et al.

(10) Patent No.: US 9,842,440 B2
(45) Date of Patent: Dec. 12, 2017

(54) SYSTEM AND METHOD OF SECURITY ENHANCEMENT IN A SECURITY PANEL

(71) Applicant: Honeywell International Inc., Morristown, NJ (US)

(72) Inventors: Jun Wu, Shanghai (CN); Yekun Gao, Shanghai (CN); Song Li, Shanghai (CN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 0 days.

(21) Appl. No.: 14/828,776

(22) Filed: Aug. 18, 2015

(65) Prior Publication Data

US 2017/0053465 A1    Feb. 23, 2017

(51) Int. Cl.
G07C 9/00 (2006.01)
B60R 25/10 (2013.01)
B60R 25/23 (2013.01)

(52) U.S. Cl.
CPC ..... G07C 9/00039 (2013.01); G07C 9/00309 (2013.01); G07C 9/00658 (2013.01); G07C 9/00817 (2013.01); G07C 9/00857 (2013.01); B60R 25/1003 (2013.01); B60R 25/23 (2013.01); G07C 9/0069 (2013.01); G07C 2009/00222 (2013.01);
(Continued)

(58) Field of Classification Search
CPC ... B60R 25/1003; B60R 25/23; G08B 25/008; G07C 9/00039; G07C 9/00309; G07C 9/00658; G07C 9/00817; G07C 9/00857; G07C 9/0069; G07C 2009/00984
See application file for complete search history.

(56) References Cited

U.S. PATENT DOCUMENTS

| 4,931,769 | A | * | 6/1990 | Phillips | G08B 25/14 340/5.32 |
| 5,907,288 | A | * | 5/1999 | Clark | G07C 9/00142 340/5.54 |
| 5,933,086 | A | | 8/1999 | Tischendorf et al. | |

(Continued)

FOREIGN PATENT DOCUMENTS

| EP | 1 083 279 A2 | 3/2001 |
| FR | 2 678 018 A1 | 12/1992 |

OTHER PUBLICATIONS

English-language translation of Abstract for patent application publication FR 2 678 018 A1, dated Dec. 24, 1992.

(Continued)

Primary Examiner — Thomas Alunkal
(74) Attorney, Agent, or Firm — Husch Blackwell LLP

(57) ABSTRACT

Systems and methods of security enhancement in a security panel are provided. Some systems can include a security system and a keyfob. The security system can identify the keyfob, receive user input identifying a valid user pass code, and transmit the valid user pass code to the keyfob. The keyfob can save the received valid user pass code, receive user input identifying a first user input mechanism, receive user input identifying a sequence of user input mechanisms, determine whether the received sequence of user input mechanisms corresponds to the saved valid user pass code, and responsive to a valid correspondence, transmit a signal to the security system with instructions to execute an action associated with the first user input mechanism.

16 Claims, 3 Drawing Sheets

(52) U.S. Cl.
CPC .............. *G07C 2009/00833* (2013.01); *G07C 2009/00873* (2013.01); *G07C 2009/00984* (2013.01)

(56) References Cited

U.S. PATENT DOCUMENTS

| | | | |
|---|---|---|---|
| 6,380,842 B1 | 4/2002 | Mattes et al. | |
| 2002/0109580 A1* | 8/2002 | Shreve | G07C 9/00103 340/5.61 |
| 2003/0190906 A1* | 10/2003 | Winick | H04M 11/04 455/404.1 |
| 2004/0257215 A1* | 12/2004 | Eskildsen | E05B 45/06 340/506 |
| 2005/0001717 A1* | 1/2005 | Bohbot | G08B 13/19645 340/531 |
| 2005/0046564 A1* | 3/2005 | Eskildsen | E05B 45/06 340/506 |
| 2006/0025110 A1* | 2/2006 | Liu | H04M 1/673 455/411 |
| 2008/0092230 A1* | 4/2008 | Addy | G07C 9/00817 726/19 |
| 2010/0081375 A1* | 4/2010 | Rosenblatt | G08C 17/02 455/41.1 |
| 2011/0239272 A1* | 9/2011 | Stone | G06F 21/00 726/2 |
| 2012/0286951 A1* | 11/2012 | Hess | G08B 25/008 340/539.1 |
| 2013/0223696 A1* | 8/2013 | Azar | G06K 9/00892 382/118 |
| 2013/0318597 A1* | 11/2013 | Parsons | G06F 21/31 726/19 |

OTHER PUBLICATIONS

Extended European search report for corresponding EP patent application 16183902.2, dated Jan. 30, 2017.

* cited by examiner

SYSTEM AND METHOD OF SECURITY ENHANCEMENT IN A SECURITY PANEL

FIELD

The present invention relates generally to security systems and methods. More particularly, the present invention relates to a system and method of security enhancement in a security panel.

BACKGROUND

Keyfobs are known in the art. For example, known keyfobs can wirelessly communicate with a security system, including a control panel of the security system. Indeed, some known keyfobs can include a disarm button that, when depressed, can wirelessly transmit a signal to the security system to disarm the security system.

However, keyfobs are highly susceptible to being stolen or lost, which can create a dangerous situation for a user of the security system. Indeed, if an unauthorized user obtains possession of a known keyfob, then he can easily disarm the security system simply by depressing the disarm button on the keyfob.

In view of the above, there is a continuing, ongoing need for improved systems and methods.

DETAILED DESCRIPTION

Figure 1:
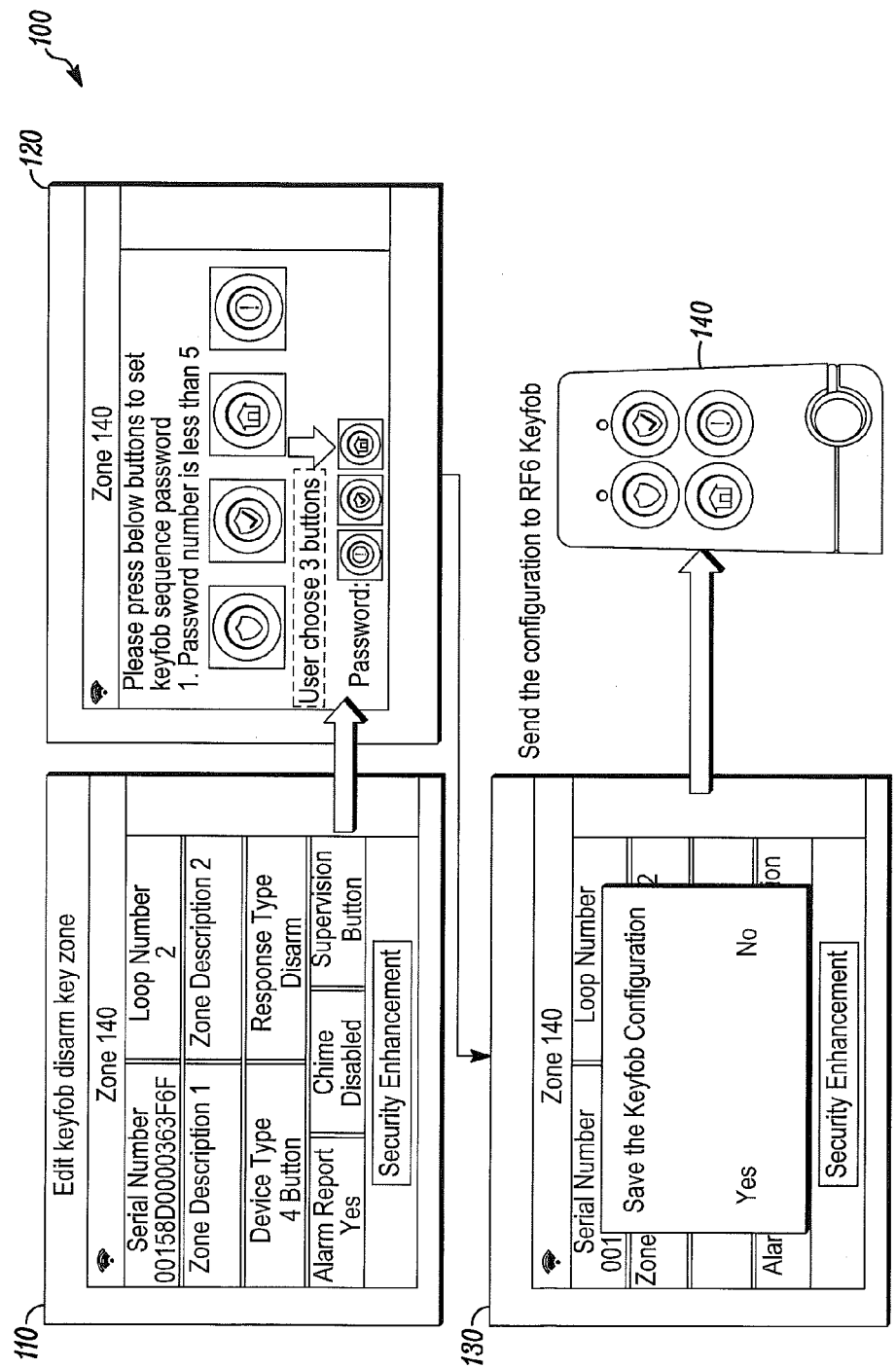
FIG. 1 is a flow diagram of a method of configuring a keyfob with a protected disarm button in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein include a system and method of security enhancement in a security panel. For example, some embodiments disclosed herein include a keyfob that can include a disarm button protected by a user pass code.

As disclosed herein, some embodiments can include configuring the keyfob with the protected disarm button. For example, a control panel of a security system can be placed in a configuration mode for the keyfob identified by the control panel. In some embodiments, a user can provide input to identify the keyfob to the control panel. Additionally or alternatively, in some embodiments, the keyfob can wirelessly transmit a signal to the control panel that includes identifying information of the keyfob.

After the control panel has identified the keyfob, the control panel can prompt the user to enter a user pass code into the control panel. For example, the pass code can include a sequence of buttons on the keyfob to be depressed by the user. The user can save the user pass code at the control panel, and the control panel can wirelessly transmit the saved user pass code to the identified keyfob.

As disclosed herein, some embodiments can also include disarming the security system with the keyfob that includes the protected disarm button. For example, the user can depress the disarm button on the keyfob and then depress the sequence of buttons on the keyfob. The keyfob can determine whether the depressed sequence of buttons corresponds to a valid user pass code saved in the keyfob. If so, then the keyfob can wirelessly transmit a signal to the control panel of the security system to disarm the security system. However, if the keyfob determines that the depressed sequence of buttons does not correspond to the valid user pass code saved in the keyfob, then the keyfob will not transmit the disarm signal to the security system.

In some embodiments, the keyfob can provide audible or visual feedback when the keyfob determines that the depressed sequence of buttons corresponds to the valid user pass code saved in the keyfob and, responsive thereto, transmit the disarm signal to the control panel of the security system. For example, the keyfob can include one or more LEDs that can flash, blink, or light up upon the occurrence of such predetermined conditions. Additionally or alternatively, the keyfob can include one or more annunciators that can beep upon the occurrence of such predetermined conditions.

FIG. 1 is a flow diagram of a method 100 of configuring the keyfob with the protected disarm button in accordance with disclosed embodiments. As seen in FIG. 1, the method 100 can include placing the control panel of the security system in the configuration mode and the control panel identifying the keyfob as in 110. For example, a user interface of the control panel can display information identified by the control panel to identify the keyfob. Such information can include the serial number of the keyfob, the type of keyfob, and the like. In some embodiments, the control panel identifying the keyfob can include the control panel receiving user input that includes the identifying information of the keyfob. Additionally or alternatively, in some embodiments, the control panel identifying the keyfob can include the keyfob wirelessly transmitting the signal to the control panel that includes the identifying information of the keyfob.

After the control panel has identified the keyfob as in 110, the method 100 can include the control panel prompting the user to enter the user pass code into the control panel and receiving user input that includes the user pass code as in 120. Then, the method 100 can include the control panel saving the entered user pass code as in 130 and wirelessly transmitting the saved user pass code to the identified keyfob as in 140.

Figure 2:
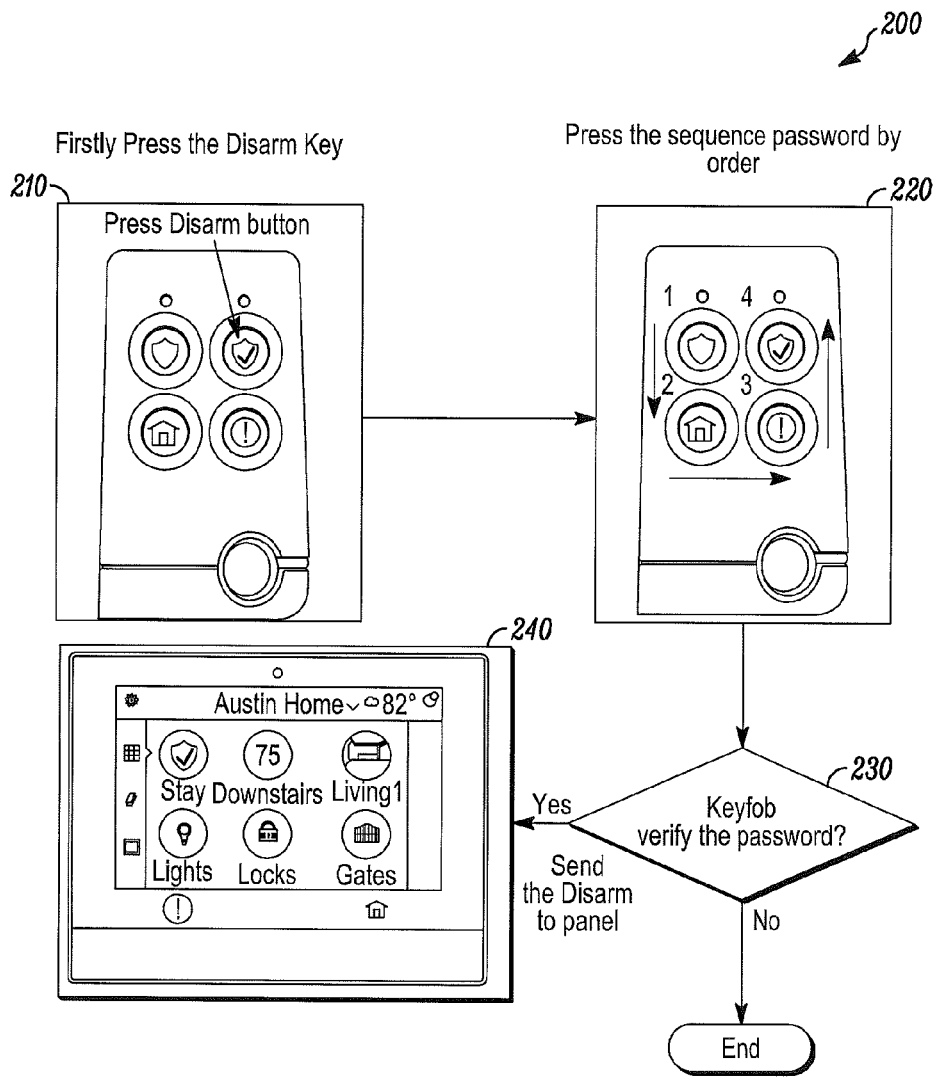
FIG. 2 is a flow diagram of a method of disarming a security system with a keyfob that includes a protected disarm button in accordance with disclosed embodiments.

FIG. 2 is a flow diagram of a method 200 of disarming the security system with the keyfob that includes the protected disarm button in accordance with disclosed embodiments. As seen in FIG. 2, the keyfob can receive user input that selects or depresses the disarm button of the keyfob as in 210 and receive user input that selects or depresses the sequence of buttons of the keyfob as in 220. Then, the keyfob can determine whether the depressed sequence of buttons corresponds to the valid user pass code saved in the keyfob as in 230. If so, then the keyfob can wirelessly transmit the signal to the control panel of the security system to disarm the security system as in 240. However, if the keyfob determines that the depressed sequence of buttons does not correspond to the valid user pass code saved in the keyfob as in 230, then the method 200 can terminate and the keyfob will not transmit the the disarm signal to the security system.

Figure 3:
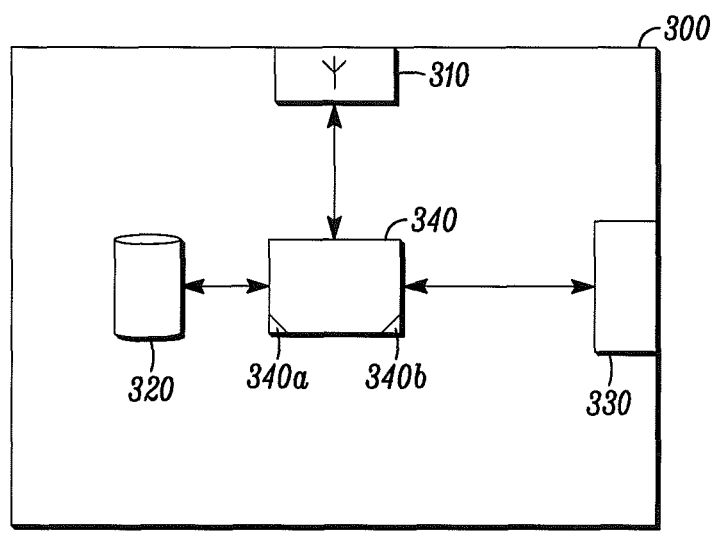
FIG. 3 is a block diagram of a keyfob in accordance with disclosed embodiments.

FIG. 3 is a block diagram of the keyfob 300 in accordance with disclosed embodiments. As seen FIG. 3, the keyfob can include a wireless transceiver 310, a memory device 320, a user interface device 330, control circuitry 340, one or more programmable processors 340a, and executable control software 340b as would be understood by one of ordinary skill in the art. The executable control software can be stored on a transitory or non-transitory computer readable medium, including, but not limited to local computer memory, RAM, optical storage media, magnetic storage media, flash memory, and the like. In some embodiments, the control software 340b can execute and control the methods for disarming the security system as described above and herein.

The wireless transceiver 310 can communicate with the control panel of the security system, and the memory device 320 can store the user pass code received from the control panel of the security system via the transceiver 310. The user interface device 330 can include a plurality of buttons or other user input mechanisms, including the disarm button. In accordance with disclosed embodiments, the user can select or depress a sequence of the user input mechanisms, and the control circuitry 340, programmable processor 340a, and executable control software 340b can compare the received sequence with the valid user pass code stored in the memory device 320. Responsive thereto, the control circuitry 340, programmable processor 340a, and executable control software 340b can determine whether to transmit the disarm signal via the transceiver 310 to the control panel of the security system.

It is to be understood that, although embodiments have been described with respect to the keyfob that includes the disarm button protected with the user pass code, systems and methods disclosed herein are not so limited. Instead, the systems and methods disclosed herein can include protecting any user input mechanism or button of the keyfob with the user pass code as disclosed and described herein.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A system comprising:
a security system; and
a keyfob having a plurality of buttons including a disarm button,
wherein the security system identifies the keyfob, receives first user input identifying a valid user pass code, and transmits the valid user pass code to the keyfob,
wherein the keyfob saves the valid user pass code, receives second user input activating the disarm button, receives third user input identifying a sequence of the plurality of buttons, determines whether the sequence of the plurality of buttons corresponds to the valid user pass code, and, responsive to a valid correspondence between the sequence of the plurality of buttons and the valid user pass code, transmits a first signal to the security system with instructions to disarm the security system, and
wherein the sequence of the plurality of buttons includes pressing the disarm button.

2. The system of claim 1 wherein the security system receives fourth user input identifying the keyfob to the security system.

3. The system of claim 1 wherein the keyfob transmits an identifying signal to the security system.

4. The system of claim 1 wherein, responsive to the keyfob determining that the sequence of the plurality of buttons fails to correspond to the valid user pass code, the keyfob fails to transmit the first signal to the security system with the instructions to disarm the security system.

5. The system of claim 1 wherein the keyfob includes an audio or visual feedback mechanism that activates responsive to the valid correspondence between the sequence of the plurality of buttons and the valid user pass code and transmission of the first signal to the security system with the instructions to disarm the security system.

6. A method comprising:
a security system identifying a keyfob, wherein the keyfob includes a plurality of buttons including a disarm button;
the security system receiving first user input identifying a valid user pass code;
the security system transmitting the valid user pass code to the keyfob;
the keyfob saving the valid user pass code;
the keyfob receiving second user input identifying the disarm button;
the keyfob receiving third user input identifying a sequence of the plurality of buttons;
the keyfob determining whether the sequence of the plurality of buttons corresponds to the valid user pass code; and
responsive to a valid correspondence between the sequence of the plurality of buttons and the valid user pass code, the keyfob transmitting a first signal to the security system with instructions to disarm the security system,
wherein the sequence of the plurality of buttons includes pressing the disarm button.

7. The method of claim 6 wherein the security system identifying the keyfob includes the security system receiving fourth user input identifying the keyfob to the security system.

8. The method of claim 6 wherein the security system identifying the keyfob includes the keyfob transmitting an identifying signal to the security system.

9. The method of claim 6 further comprising, responsive to the keyfob determining that the sequence of the plurality of buttons fails to correspond to the valid user pass code, the keyfob failing to transmit the first signal to the security system with the instructions to disarm the security system.

10. The method of claim 6 further comprising, responsive to the valid correspondence between the sequence of the plurality of buttons and the valid user pass code and transmission of the first signal to the security system with the instructions to disarm the security system, the keyfob activating an audio or visual feedback mechanism on the keyfob.

11. A keyfob comprising:
a plurality of buttons including a disarm button;
a wireless transceiver;
a memory device;

a programmable processor; and
executable control software stored on a non-transitory computer readable medium,
wherein the memory device stores a valid user pass code,
wherein the plurality of buttons receives first user input identifying the disarm button,
wherein the plurality of buttons receives second user input identifying a sequence of the plurality of buttons,
wherein the programmable processor and the executable control software compare the valid user pass code stored in the memory device with the sequence of the plurality of buttons,
wherein, responsive to the valid user pass code matching the sequence of the plurality of buttons, the programmable processor and the executable control software transmit a first signal to a security system, via the wireless transceiver, with instructions to disarm the security system, and
wherein the sequence of the plurality of buttons includes pressing the disarm button.

12. The keyfob of claim 11 wherein the programmable processor and the executable control software transmit an identifying signal to the security system, via the wireless transceiver, to identify the keyfob to the security system.

13. The keyfob of claim 11 wherein the programmable processor and the executable control software receive from the security system, via the wireless transceiver, the valid user pass code to store in the memory device.

14. The keyfob of claim 11 wherein, responsive to the valid user pass code failing to match the sequence of the plurality of buttons, the keyfob fails to transmit the first signal to the security system with the instructions to disarm the security system.

15. The keyfob of claim 11 further comprising an audio feedback mechanism, wherein, responsive to the valid user pass code matching the sequence of the plurality of buttons and transmission of the first signal to the security system with the instructions to disarm the security system, the programmable processor and the executable control software activate the audio feedback mechanism.

16. The keyfob of claim 11 further comprising a visual feedback mechanism, wherein, responsive to the valid user pass code matching the sequence of the plurality of buttons and transmission of the first signal to the security system with the instructions to disarm the security system, the programmable processor and the executable control software activate the visual feedback mechanism.

* * * * *